United States Patent [19]

Gonzalez et al.

[11] Patent Number: 4,698,934
[45] Date of Patent: Oct. 13, 1987

[54] INSECT TRAP

[76] Inventors: Octavio R. Gonzalez, 3427 Savannah Ave.; Ray Gonzalez, 3329 Mobile Ave., both of El Paso, Tex. 79930; Roy Gonzalez, 11101 Tenaha Ave., El Paso, Tex. 79936

[21] Appl. No.: 945,793

[22] Filed: Dec. 23, 1986

[51] Int. Cl.⁴ ............................................. A01M 1/20
[52] U.S. Cl. ....................................................... 43/121
[58] Field of Search ...................... 43/121, 133, 132.1, 43/107

[56] References Cited

U.S. PATENT DOCUMENTS

| | | | |
|---|---|---|---|
| 134,444 | 12/1872 | Still | 43/121 |
| 137,336 | 4/1873 | Ames | 43/121 |
| 473,965 | 5/1892 | Royse | 43/121 |
| 567,076 | 9/1896 | Brown | 43/121 |
| 602,410 | 4/1898 | Selvidge | 43/121 |
| 642,421 | 1/1900 | Boyd | 43/121 |
| 671,341 | 4/1901 | Inman | 43/121 |
| 673,155 | 4/1901 | Blanchard | 43/121 |
| 885,536 | 4/1908 | Shimer | 43/121 |
| 970,528 | 7/1909 | Miller | 43/121 |
| 986,015 | 7/1910 | Lambert | 43/121 |
| 1,002,919 | 9/1911 | Knox | 43/121 |

Primary Examiner—Gene P. Crosby
Assistant Examiner—Karen Skillman
Attorney, Agent, or Firm—James J. Brown

[57] ABSTRACT

A trap for insects such as ants is described which fits over the insect hill or mound and traps both emerging and returning members of the insect community. The trap is provided with a unique cover which prevents winged members of the community from flying out of the trap to establish nests and reproduce elsewhere. Provision is also made in the trap for drainage so that water does not accumulate and destroy the effectiveness of the trap.

6 Claims, 3 Drawing Figures

INSECT TRAP

SUMMARY OF THE INVENTION

The present invention is directed to a trap for insects such as ants which is particularly adapted to not only contain and confine the insects but to eliminate the infestation. More specifically, the present invention is directed to an insect trap which is designed to be applied over an ant hill or similar insect residence to trap both the insects emerging from the hill and those attempting to return as well as the queen or any members of the insect community which may be adapted for flight.

BACKGROUND OF THE INVENTION

One of the most induring struggles between mankind and the natural world has been the struggle to control and eliminate various types of insect infestations which annually cause enormous discomfort, disease, death and loss of valuable property. In some of the southerly regions of the United States, a particularly troublesome problem has been the control of ant populations and especially the large, aggressive ants of those regions whose bite can be both extremely painful and serious and whose proliferation constitutes a serious and continuing problem.

The use of various toxic chemicals and poisons to control ants and other insects has long passed from favor due to environmental concerns and increased awareness of the deleterious side effects which these toxic substances frequently possess. Further, natural predators for these insects are generally not found in sufficient numbers in the affected areas.

As an alternative to poisons, toxic chemicals and predators, it has been proposed employ various forms of traps for containing and confining infestations of insects such as ants. One type of trap which has been used essentially fits either within or around the ant hill in which the colony of ants resides and serves essentially to trap them as they emerge from the hill. Devices of the prior art, however, which have attempted to control infestations of ants in this fashion have suffered from several disadvantages including the inability to confine members of the ant community which may be able to fly and therefore emerge from the trap. Since the queen ant is equipped with wings for flying, the inability to contain this particular member of the insect community results in the queen being able to move to another location and begin again the cycle of reproduction outside of the trap. Additionally, many of the ant traps which have been proposed have required frequent attention and could not be left for extended periods unattended since they have a disposition to fill with rain water to the extent that eventually the water overflows and permits surviving members of the community to emerge from the trap.

It is accordingly an object of the present invention to provide a trap for confining and eliminating infestations of ants at a particular location which avoids the need for continuous monitoring and attention and which also provides for the capture and confinement of all members of the ant community including those capable of flight and subsequent reproduction such as the queen.

CITATION OF PRIOR ART

The following U.S. patents describe insect traps of various configurations:

U.S. Pat. Nos. 1,002,919 to Knox; 602,410 to Selvidge; 137,336 to Ames; 140,954 to Rubarth; 473,965 to Royse; 673,155 to Blanchard; 944,568 to Mercer; 970,528 to Miller; 986,015 to Lambert; 567,076 to Brown; 884,928 to Howard; 885,536 to Shimer; 671,341 to Inman; 134,444 to Stell.

DETAILED DESCRIPTION OF THE INVENTION

The present invention is a trap for insects such as ants which comprises a frusto-conical outer casing disposed on a flat base having a central opening and a cylindrical intermediate member disposed on the base within the outer casing. An inverted frusto-conical inner member is disposed within the cylindrical member with its lower edge resting on the flat base and generally coextensive with the central opening. The upper edge of the inner member extends below the height of the upper edge of the intermediate member which in turn projects above the upper edge of the outer casing. A generally round cover is provided which rests on the upper edge of the cylindrical intermediate member to prevent insects from emerging from the trap. This cover as well as the base are preferably perforated to permit rain water to pass through the trap into the ground without filling the trap. The details of construction as well as the use of the present invention will however be more completely understood by having reference to the drawings.

Figure 1:
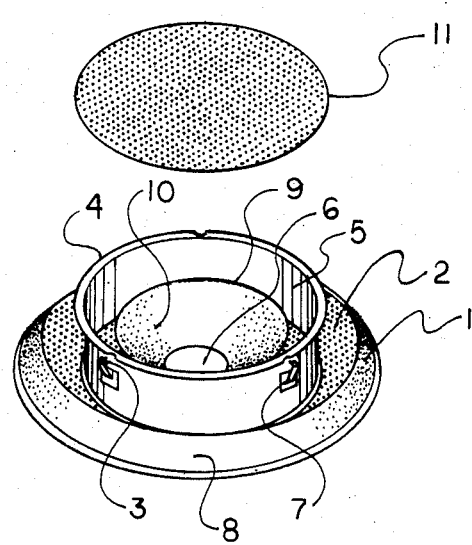
FIG. 1 is a perspective view showing the ant trap of the present invention with the top cover removed.
Figure 2:
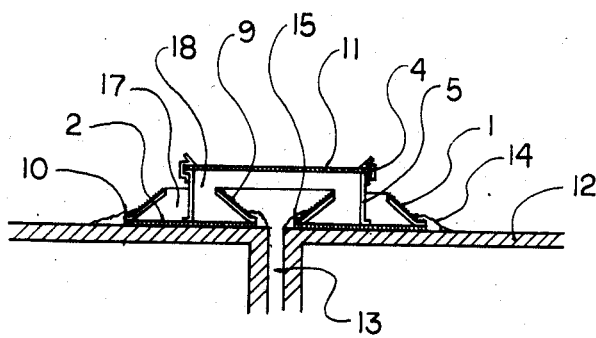
FIG. 2 is a side cutaway view showing the ant trap of the invention in place over an ant hill.
Figure 3:
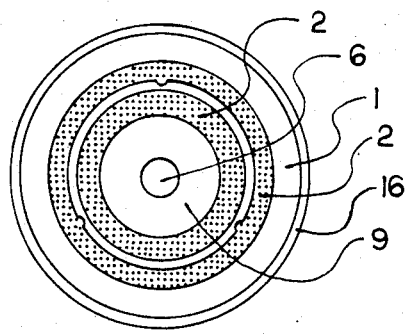
FIG. 3 is an overhead view of the ant trap of the invention with the coverplate removed to expose the interior members.

Directing attention particularly to FIGS. 1 and 3, it will be seen that a frusto-conical outer casing 1 is provided which rests on a flat, perforated circular base 2. A generally cylindrical intermediate member 5 also rests on the base 2 within outer casing 1 and at a distance therefrom. Within the cylindrical intermediate member 5, a inverted frusto-conical inner member 9 also rests on the base 2 with its lower edge generally coextensive with the opening 6 provided in the base 2. With reference to FIG. 2 of the drawings, it will especially be noted that while the outer casing 1 and the inner member 9 generally extend to about the same height, the interemediate cylindrical member 5 actually extends vertically above both of the outer casing and the inner member. Further, the inner cylinder 5 is provided on its upper edge with a flange 4 which receives the perforated cover 11 of approximately the same dimensions. Fasteners 7 and 3 are conveniently provided on the intermediate cylindrical member 5 to attach the top cover 11 and retain it in position. For reasons which will become apparent, the surfaces 10 of the inner member 9 and the surface 8 of the outer casing 1 are provided with a roughened or abrasive material.

With continued reference to FIG. 2, it will be now explained how the trap of the present invention is installed and functions in accordance with the invention. Once a hill which serves as residence for ants or similar insects is identified, the trap of the present invention is placed over the hill so that the hole 6 is directly over the entrance 13 to the ant hill. Surrounding dirt 15 is then placed around the periphery of the hole 6 to mask the interface between te inner member 9 and the entrance to the hole 13. Similarly, surrounding dirt 14 is placed over the edge 16 of the base 2 and outer casing 1 so that insects attempting to return to the entrance 13 along the ground 12 will not encounter the outer periphery of the base of the ant trap but rather only the carefully mounded dirt leading to the sloping surface of the outer casing 1. As previously noted, the surface of the outer casing 1 is provided with an abrasive or roughened material 8 whose purpose is to permit insects returning to the nest to crawl over the inclined surface of the outer casing and to insulate the trap so it does not overheat. This material can for example be dirt like substances or actually dirt or sand which are affixed to the casing by means of suitable adhesive. Similarly, the surface 10 of the inner member 5 is provided with roughened material of the same nature to permit insects emerging from the entrance 13 to climb up the inclined surface. In the case of insects returning to the habitat from the outside, upon reaching the top of the outer casing 1, they will fall into the space 17 defined by the inclined wall outer casing and the vertical wall of intermediate cylinder 5 and be confined therein. The perforated base prevents the insects from crawling under the trap to escape and the inclined walls of the outer casing and vertical walls with the upper flange member 4 prevent the insects from crawling up and out of this section of the trap. Insects emerging from the habitat through hole 13 on the other hand will crawl up the inclined surface 10 and fall into the area 18 defined by the inclined inner member 9 and the vertical wall of intermediate cylinder 5. These insects will be similarly confined by the base 2 as well as the surrounding walls and the cover member 11 which prevents insects capable of flight from emerging from the trap.

It will be appreciated, that for reasons of durability, the present invention is most conveniently made of non-corrosive metals such as stainless steel or aluminum but may also be constructed of other materials as desired. It will be further apparent that the device of the present invention can be constructed in various sizes depending upon the nature and size of the insect infestations to which it is to be applied. It will further be apparent that depending upon the size of the insects being trapped and eliminated, the perforations in the top cover and base can be conveniently varied. Other variations in structure will be apparent to those of ordinary skill in the art but are considered to fall within the scope of the present invention as defined in the claims appended herewith.

What is claimed:

1. An insect trap comprising a frusto-conical outer casing disposed on a flat base provided with a centrally disposed opening therethrough, a cylindrical intermediate member also disposed on said base within said outer casing in spaced relationship thereto and having generally vertical walls which extend above the upper edge of said casing, an inverted frusto-conical inner member disposed within said cylindrical member with its lower edge resting on said base and being generally coextensive with said central opening, the upper edge of said inner member being spaced from and extending below the upper edge of said intermediate member, and a cover means disposed over and resting on the upper edge of the walls of said cylindrical intermediate member.

2. The insect trap of claim 1 wherein said base and said cover are both perforated.

3. The insect trap of claim 2 wherein the perforations are sufficiently small to substantially prevent egress by said insects.

4. The insect trap of claim 1 wherein the upper edge of said cylindrical intermediate member is provided with a flange to receive said cover means.

5. The insect trap of claim 1 wherein the outside surface of said outer casing and the inside surface of said inner members are provided with a roughened surface to facilitate traverse by said insects.

6. An ant trap comprising a frusto-conical outer casing having a roughened outer surface disposed on a flat perforated base provided with a centrally disposed opening therethrough, a cylindrical intermediate member also disposed on said base within said outer casing in spaced relationship thereto and having generally vertical walls which extend above the upper edge of said casing, an inverted frusto-conical inner member having a roughened inner surface disposed within said cylindrical member with its lower edge resting on said base and being generally coextensive with said central opening, the upper edge of said inner member being spaced from and extending below the upper edge of said intermediate member, and removable perforated cover means disposed over and resting on the upper edge of the walls of said cylindrical intermediate member.

* * * * *